United States Patent
Inoue (10) Patent No.: US 6,446,499 B1
(45) Date of Patent: Sep. 10, 2002

(54) DIAGNOSTIC APPARATUS FOR ASSIST AIR SUPPLY SYSTEM OF ENGINE

(75) Inventor: Norikazu Inoue, Tokyo (JP)

(73) Assignee: Fuji Jukogyo Kabushiki Kaisha, Tokyo (JP)

(*) Notice: Subject to any disclaimer, the term of this patent is extended or adjusted under 35 U.S.C. 154(b) by 25 days.

(21) Appl. No.: 09/706,008

(22) Filed: Nov. 3, 2000

(30) Foreign Application Priority Data

Nov. 5, 1999 (JP) .......................................... 11-315147

(51) Int. Cl.⁷ .............................................. G01M 15/00
(52) U.S. Cl. ...................................................... 73/118.2
(58) Field of Search .............................. 73/116, 117.2, 73/117.3, 118.1, 118.2; 123/184.21, 184.27, 184.52

(56) References Cited

U.S. PATENT DOCUMENTS

| | | | | |
|---|---|---|---|---|
| 5,299,550 A | * | 4/1994 | Inoue | .......................... 123/674 |
| 5,408,871 A | * | 4/1995 | Lieder et al. | .......... 123/339.11 |
| 5,487,372 A | * | 1/1996 | Iida et al. | .................... 123/479 |
| 5,560,199 A | * | 10/1996 | Agustin et al. | ................ 60/274 |

FOREIGN PATENT DOCUMENTS

| | | |
|---|---|---|
| JP | 814143 | 1/1996 |
| JP | 814144 | 1/1996 |

* cited by examiner

Primary Examiner—Eric S. McCall
(74) Attorney, Agent, or Firm—Martin A. Farber (57) ABSTRACT

A diagnostic apparatus of an assist air supply system of an engine, in which an AAI solenoid valve is provided in an assist air passage and when diagnosing, a difference between a maximum value of intake manifold pressure when the AAI solenoid valve opens and a minimum value of intake manifold pressure when the AAI solenoid valve closes is calculated. When the calculated difference is smaller than a specified threshold value, it is judged that there is something abnormal in the assist air supply system.

4 Claims, 5 Drawing Sheets

DIAGNOSTIC APPARATUS FOR ASSIST AIR SUPPLY SYSTEM OF ENGINE

BACKGROUND OF THE INVENTION

1. Field of the Invention

The present invention relates to an air assist system of an engine for enhancing dispersion and atomization of fuel by injecting a part of intake air (assist air) toward the vicinity of a fuel injection nozzle and more particularly to a diagnostic apparatus for the air assist system.

2. Discussion of Background Arts

In automobile engines, a so-called "assist air supply system", in which a part of intake air (assist air) is introduced from the intake air passage upstream of a throttle valve to the vicinity of an injection nozzle of a fuel injector and injected from an air assist injector so as to enhance dispersion and atomization of the fuel injected from the fuel injector and to improve fuel economy and exhaust emissions, has been broadly employed. As an example of the assist air system, there is a known assist air supply apparatus in which the assist air is introduced during idling from the upstream side of an idle speed control valve (hereinafter referred to as ISC valve) for adjusting the intake air at idling and the amount of the assist air is controlled by an assist air solenoid valve (hereinafter referred to as AAI solenoid valve) provided at the assist air passage.

In such an assist air supply system, the clogging of the assist air passage, the disconnection of the assist air pipe, failures of the AAI solenoid valve and the like are serious failures and objects to be diagnosed. For example, Japanese Patent Applications Laid-open No. Toku-Kai-Hei 8-14143 and No. Toku-Kai-Hei 8-14144 propose diagnostic apparatuses for making a diagnosis of those failures.

In the disclosure Toku-Kai-Hei 8-14143, when the time-versus rate of change of the throttle opening angle is smaller than a predetermined value and in a steady state, a diagnosis is performed. That is, the electromagnetic valve (AAI solenoid valve) in the assist air passage is forcedly energized and deenergized to judge whether or not the assist air supply system is normal based on the change of output of an air flow meter.

Further, in the disclosure Toku-Kai-Hei 8-14144, while the air-fuel ratio feedback control is carried out, an air-fuel ratio feedback correction coefficient is calculated for respective cases of when the assist air is supplied and when it is shut off to judge whether the assist air supply system is normal or abnormal based the difference between both cases.

However, in the respective prior arts, the diagnosis of the assist air supply system is made by forcedly opening and closing the AAI solenoid valve, while fuel is supplied from the fuel injector. That is, in case of the disclosure Toku-Kai-Hei 14143, when the throttle valve is in an open steady condition, since the diagnosis is performed while fuel is supplied from the fuel injector, the electromagnetic valve is forcedly energized and deenergized. Further, in case of the disclosure Toku-Kai-Hei 8-14144, in order to see the change of the air-fuel ratio feedback correction coefficient, it is impossible to diagnoses without supplying fuel from the fuel injector.

Accordingly, in these diagnostic apparatuses, during the diagnosis of the assist air supply system, the actual air-fuel ratio is subjected to changes as a result of the forced opening and closing of the AAI solenoid valve. That is, when the AAI solenoid valve opens, the air-fuel ratio changes to the lean side and when it closes, the air-fuel ratio changes to the rich side. As a result, the attempt to make a diagnosis exacerbates the exhaust emissions.

In case of making a diagnosis based on the behavior of output of an air-fuel ratio sensor as in Toku-Kai-Hei 8-14144, since the change of the output of the air-fuel ratio sensor is small, the diagnosis is easily affected by other air-fuel ratio changing factors such as canister purging, and as a result erroneous diagnoses are apt to occur.

SUMMARY OF THE INVENTION

It is an object of the present invention to provide a diagnostic apparatus capable of diagnosing miscellaneous failures of the air assist supply system, such as clogged assist air passages, disconnected pipes, a stuck AAI solenoid valve and the like without adverse effects on exhaust emissions.

In order to achieve the object, a diagnostic apparatus of an assist air supply system of an engine comprises a difference calculating means for calculating a difference between a first detection value of an intake manifold pressure when an assist air is supplied by controlling an assist air supply control valve in the condition that the engine is in a fuel-cut mode and that a valve opening angle of an idle speed control valve is constant and a second detection value of the intake manifold pressure when the assist air is shut down by controlling the assist air supply control valve in the condition that the engine is in a fuel-cut mode and that a valve opening angle of the idle speed control valve is constant and an abnormality judging means for judging an abnormality of the assist air supply system when the difference between the first detection value and the second detection value is smaller than a specified threshold value.

DETAILED DESCRIPTION OF THE PREFERRED EMBODIMENT

Figure 4:
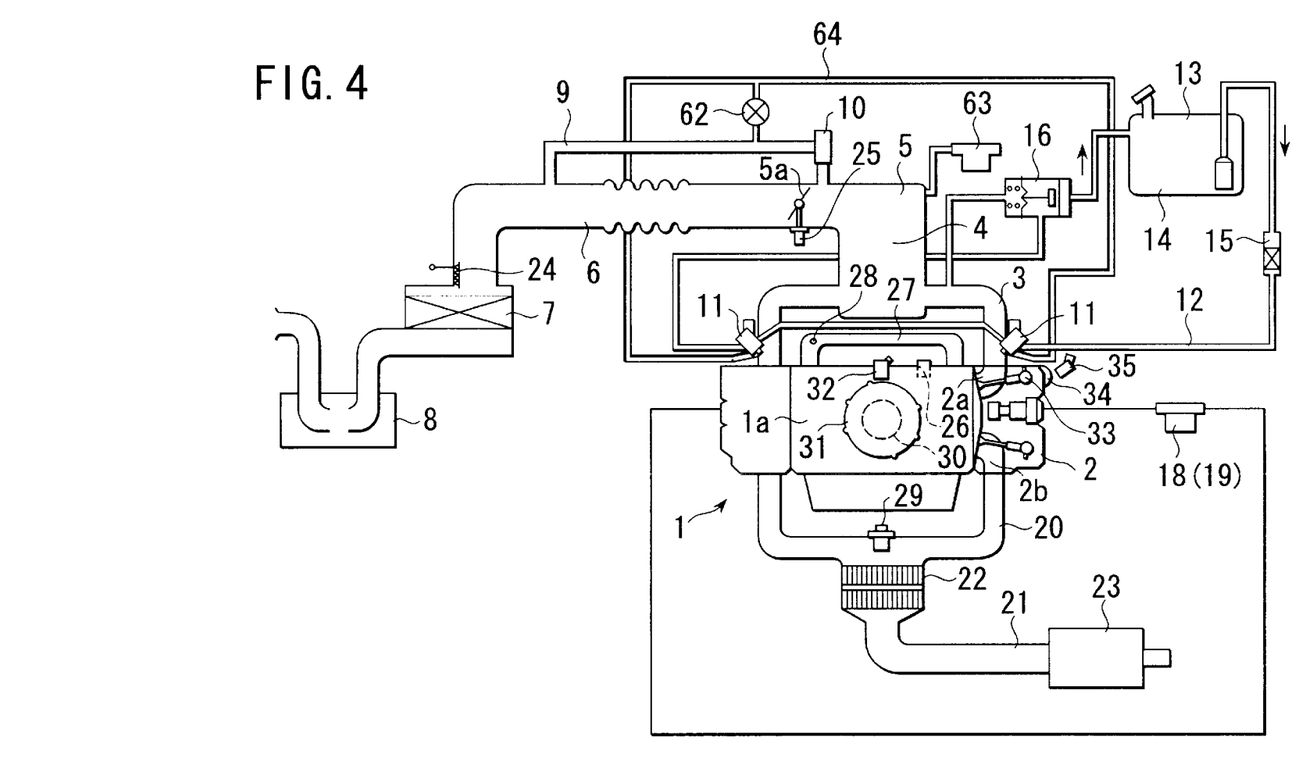
FIG. 4 is a schematic diagram of an engine according to the present invention.

Referring now to FIG. 4, reference numeral 1 denotes an engine and in this embodiment the engine 1 is a horizontally opposed four cylinders gasoline engine. A cylinder head 2 is provided on left and right banks of a cylinder block 1a of the engine 1, respectively. Further, an intake port 2a and an exhaust port 2b are formed in the respective cylinder heads 2, 2.

An air intake system of the engine 1 comprises an intake manifold 3 communicating with the intake port 2a of the cylinder head 2, an air chamber 4 formed at a pronged portion of the intake manifold 3, a throttle chamber 5 provided upstream of the air chamber 4, a throttle valve 5a accommodated in the throttle chamber 5, an intake pipe 6 provided upstream of the throttle chamber 5, an air cleaner 7 provided upstream of the intake pipe 6 and an air intake chamber 8 provided upstream of the air cleaner 7.

Further, the intake pipe 6 is connected with a bypass passage 9 bypassing the throttle valve 5a. Further, the bypass passage 9 is provided with an idle speed control valve (ISC valve) 10 for controlling idle speeds by adjusting the bypass air amount flowing through the bypass passage 9.

In this embodiment, an air assist type fuel injector (hereinafter referred to as fuel injector) 11 is employed. The bypass passage 9 is at the upstream portion of the ISC valve 10 with an assist air passage 64 through an assist air solenoid valve (hereinafter referred to as AAI solenoid valve) 62 for supplying or shutting off an assist air. The assist air passage 64 is pronged into a plurality of branch passages downstream of the AAI solenoid valve 62. Each of the branch passages communicates at the end thereof with the vicinity of an injection nozzle of the fuel injector 11.

Since the assist air passage 64 is connected with the vicinity of the injection nozzle of the respective fuel injectors 11, when the AAI solenoid valve 62 opens, the assist. air is injected to the neighborhood of the injection nozzle of the fuel injector 11, thereby diffusion and atomization of the fuel injected from the fuel injector 11 is enhanced.

Further, the fuel injector 11 communicates with a fuel tank 13 through a fuel feed line 12. The fuel tank 13 is provided with an in-tank type fuel pump 14. Fuel fed from the fuel pump 14 is sent to the fuel injector 11 and a pressure regulator 16 through a fuel filter 15 provided in the fuel feed line 12. The pressure regulator 16 sends a part of fuel back to the fuel tank 13 to regulate the fuel pressure at a specified value.

Further, a spark plug 17 is provided in the respective cylinders of the cylinder head 2 such that an electrode of the spark plug 17 is exposed to a combustion chamber of the respective cylinders. The spark plug 17 is connected with an ignition coil 18 incorporating an igniter 19 therein.

On the other hand, an exhaust manifold 20 communicate at the upstream portion thereof with the respective exhaust ports 2b of the cylinder head 2 and communicates at the pronged portion thereof with an exhaust pipe 21 through a catalyst converter 22. Further, the exhaust pipe 21 is connected at the downstream thereof with a muffler 23.

Further, there is provided an intake air flow sensor 24 using a hot wire or hot film in the intake pipe 6 immediately downstream of the air cleaner 7. Further, the throttle valve 5a is provided with a throttle opening angle sensor 25 for detecting an opening angle of the throttle valve 5a. Further, as an intake manifold pressure detecting means, an intake manifold pressure sensor 63 for detecting an intake manifold pressure at the downstream of the throttle valve 5a is connected with the air chamber 4.

Further, there is provided a knock sensor 26 in the cylinder block 1a of the engine 1. Further, there is provided a coolant temperature sensor 28 in a coolant passage 27 connecting left and right banks of the cylinder block 1a. Further, an oxygen sensor 29 is disposed at the upstream of the catalytic converter 22.

Further, a crank angle sensor 32 for detecting a crank angle is provided on the outer periphery of a crank rotor 31 coaxially mounted on a crank shaft 30 of the engine 1. Further, a cam angle sensor 35 for identifying a cylinder in combustion stroke, a cylinder in fuel injection stroke or a cylinder in ignition stroke in the relationship with the crank angle detected by the crank angle sensor 32, is provided on a cam rotor 34 secured to a cam shaft 33 which rotates at half speed of the crank shaft 30.

Figure 5:
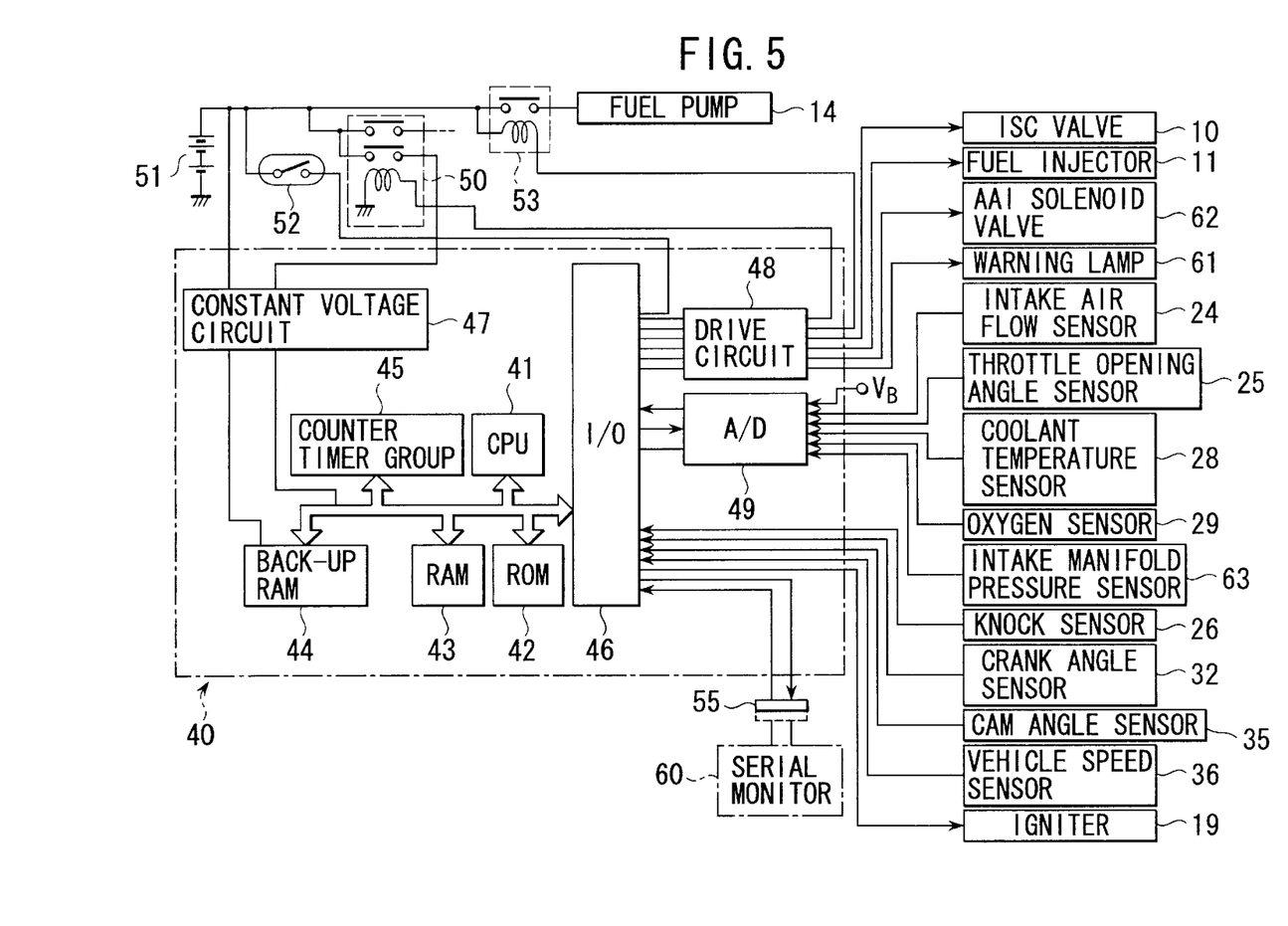
FIG. 5 is a block diagram of an electronic control circuit according the present invention.

Next, the construction of an electronic control system for controlling the engine 1 will be described. FIG. 5 is a block diagram showing a circuit construction of an electronic control system according to a first embodiment of the present invention. Calculations of the control values and outputs of control signals with respect to actuators such as a fuel injector 11, an ignitor 19, an ISC control valve 10 and the like, that is, the engine controls such as a fuel injection control, an ignition control, an idle speed control and the like, are conducted by an electronic control unit (ECU) 40 as shown in FIG. 5.

The ECU 40 is a micro-computer comprising CPU 41, ROM 42, RAM 43, back-up RAM 44, counter/timer group 45, I/O interface 46 and a bus line for connecting these components with each other. Further, the ECU 40 incorporates a constant voltage circuit 47 for supplying a stable electric source to the components, a drive circuit 48 connected with the interface 46, A/D converter 49 and other peripheral circuits.

The counter/timer group 45 includes a free-run counter, miscellaneous counters such as a cylinder identification pulse counter, a fuel injection timer, an ignition timer, a periodic interruption timer for generating periodical interruption, and miscellaneous timers such as a timer for measuring a time interval between crank angle sensor signals, a watchdog timer for monitoring abnormality. Further, miscellaneous software counters and timers are also employed.

The constant voltage circuit 47 is connected with a battery 51 through a first relay contact of an electric source relay 50 having relay contacts of two circuits and at the same time directly with the battery 51. When an ignition switch 52 is turned on and the contact of the electric source relay 50 is closed, electric source is supplied to the components in the ECU 40 and backup electric source is constantly supplied to the backup RAM 44 irrespective of the ON or OFF condition of the ignition switch 52. Further, the battery 51 is connected with a fuel pump 14 through a relay contact of a fuel pump relay 53. Further, the battery 51 is connected with an electric source wire for supplying electric source to respective actuators.

On the other hand, input ports of the I/O interface 46 are connected with the ignition switch 52, the knock sensor 26, the crank angle sensor 32, the cam angle (cylinder identification) sensor 35, a vehicle speed sensor 36 and the like. Further, it is connected with the intake air flow sensor 24, throttle opening angle sensor 25, the coolant temperature sensor 28, the oxygen sensor 29, the intake manifold pressure sensor 63 and the like through an A/D converter 49. Also, the battery voltage $V_B$ is inputted to the A/D converter for monitoring.

On the other hand, output ports of the I/O interface 46 are connected with respective relay coils of the electric source relay 50 and the fuel pump relay 53, the ISC valve 10, the fuel injector 11, the AAI solenoid valve 62, a warning lamp 61 and the like through the drive circuit 48. Also, the I/O interface 46 is connected with the igniter 19.

Further, the I/O interface 46 is connected with an external connector 55. This external connector 55 is connected with a serial monitor (portable type diagnostic apparatus) 60 to read out input and output data of the ECU 40 and trouble data stored in the back-up RAM 44 by the self-diagnostic function of the ECU 40, informing of failure positions and failure contents, and including an assist air NG flag which will be described hereinafter for indicating failures of the assist air supply system. Further, the serial monitor 60 enables to make an initial setting (clear) of those trouble data.

The diagnosis and initial setting by means of the serial monitor 60 are described in detail in Japanese Patent Application Examined No. Toku-Kou-Hei 7-76730.

The CPU 41 processes signals inputted from sensors and switches and the battery voltage via the I/O interface 46 according to the control program stored in the ROM 42. Further, based on miscellaneous data stored in the RAM 43, miscellaneous learning value data stored in the back-up RAM 44, fixed data memorized in the ROM 42 and the like, the CPU 41 calculates an injection volume for an individual cylinder, an ignition timing for an individual cylinder, a duty ratio of the drive signal for the ISC control valve 10 and the like and makes such engine controls as per-cylinder fuel injection control, per-cylinder ignition timing control, idle speed control and the like.

The ECU 40 makes a diagnosis of the assist air supply system based on the change of intake manifold pressure downstream of the throttle valve 5a. The assist air supply system comprises the assist air passage 64 for supplying a part of intake air of the engine 1 as an assist air to the vicinity of the injector nozzle of the fuel injector 11 and the AAI solenoid valve provided on the assist air passage 64 for controlling the assist air supply. When a diagnosis is made to the assist air supply system, during the fuel-cut period where no fuel is injected from the fuel injector 11, the AAI solenoid valve 62 is forcedly energized and deenergized interchangeably so as to change over from the supply state to the shutting-off state of the assist air and vice versa. At this moment, the intake manifold pressure sensor 63 detects the intake manifold pressure downstream of the throttle valve 5a at the supply state and the shutting-off state of the assist air. When the difference between both detected values is smaller than a threshold value LVLMIS, it is diagnosed that the assist air supply system is in a failure condition.

Since the diagnosis is made during the fuel-cut period, it is possible to surely diagnose the assist air supply system without having adverse effects on exhaust emissions.

Further, since this method of diagnosis is not dependent on the output value of the air-fuel ratio sensor, it is possible to make a diagnosis without having an effect of the small change of the output of the air-fuel ratio sensor. Further, since there is no effect of other changing factors of air-fuel ratio such as canister purging, the accuracy of diagnosis can be raised. Further, normally, since many engines employ the intake manifold pressure sensor for detecting intake manifold pressure downstream of the throttle valve 5a, the diagnostic system according to this embodiment does not need additional components, nor cost increase.

Describing the embodiment in more detail, during the fuel-cut period in which no fuel is injected from the fuel injector 11, when the valve opening angle of the ISC valve 10 is constant, the AAI solenoid valve 62 provided on the assist air passage 64 is forcedly turned ON and OFF so as to change over between the state of supplying air to the fuel injector 11 and the state of shutting-off the air supply. Then, a maximum value MBPOPENMAX of the intake manifold pressure MBP downstream of the throttle valve 5a in a condition of supplying air and a minimum value MBPCLOSEMIN of the intake manifold pressure MBP in a condition of shutting-off the air supply, are detected respectively. Further, when the difference between both detected values is smaller than the threshold value LVLMIS, it is diagnosed that the assist air supply system is in a failure condition.

According to the embodiment, a part of intake air is introduced as an assist air from the bypass passage 9 having the ISC valve 10 and the assist air is supplied from the assist air passage 64 branched from the bypass passage 9 to the fuel injector 11 downstream of the throttle valve 5a.

Because of this construction, the throttle valve is in a fully closed condition during a fuel-cut mode. Accordingly, if the valve opening angle of the ISC valve 10 is constant, the intake manifold pressure downstream of the throttle valve 5a changes definitely by switching between the condition of supplying the assist air to the fuel injector 11 and the condition of shutting-off, when the assist air supply system is normal. Therefore, it is possible to make a proper diagnosis of the assist air supply system by the difference of the intake manifold pressure downstream of the throttle valve 5a between the condition of supplying the assist air and the condition of shutting-off, and as a result the accuracy of diagnosis can be enhanced.

Further, by making use of the maximum value MPBOPENMAX of the intake manifold pressure MBP downstream of the throttle valve 5a when supplying the assist air and the minimum value MPBCLOSEMIN of the intake manifold pressure MBP when shutting-off the assist air, it is possible to enlarge the difference of both detected values when supplying the assist air and when shutting-off the assist air and as a result it is possible to make a more accurate diagnosis of the assist air supply system.

Figure 1:
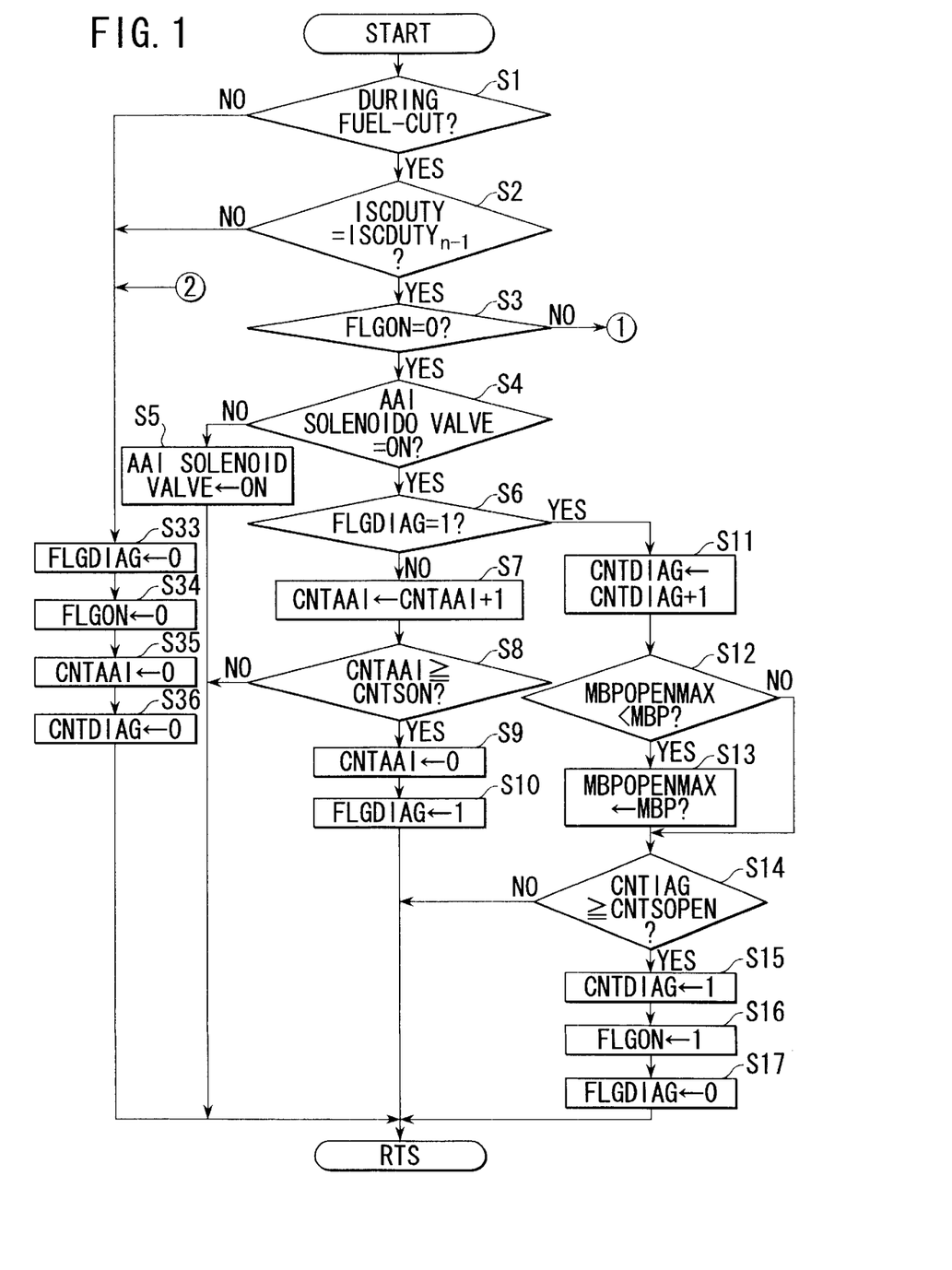
FIG. 1 is a flowchart showing a diagnostic routine of an assist air supply system according to the present invention.
Figure 2:
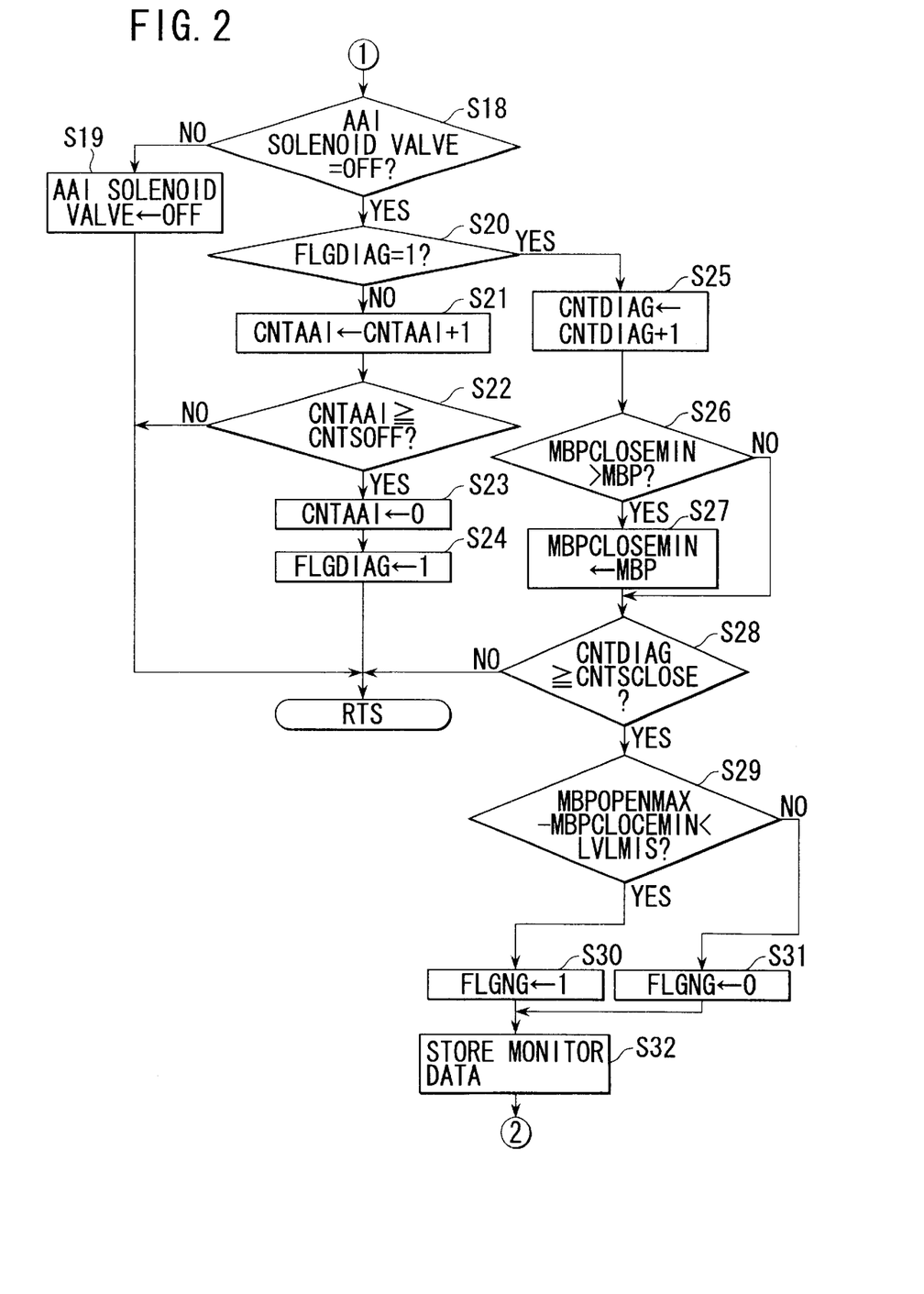
FIG. 2 is a flowchart continued from FIG. 1.

The diagnostic processes of the assist air supply system according to the present invention are carried out in the ECU 40 and those processes will be described hereinafter by reference to the flowcharts shown in FIGS. 1 and 2.

First, when the ignition switch 52 is turned on and electric source is supplied to the ECU 40, the system is initialized, that is, flags and counters except for trouble data and learning values are initialized. Further, when the engine 1 starts, a routine for diagnosing the assist air supply system, as shown in FIGS. 1 and 2, are executed every 10 milliseconds.

In this assist air diagnosing routine, when predetermined diagnostic conditions are satisfied, the AAI solenoid valve 62 is forcedly turned ON and OFF and the change of intake manifold pressure at this moment is detected by the intake manifold pressure sensor 63. The assist air supply system is diagnosed by whether or not the pressure difference between ON and OFF exceeds a specified threshold value.

First, at a step S1, it is judged whether or not the vehicle is decelerated and the engine is in a fuel-cut mode. If the AAI solenoid valve 62 is turned ON and OFF while fuel is injected, as described before, the air-fuel ratio changes and as a result exhaust emissions exacerbates.

Then, if the engine is in a fuel-cut mode, the program goes to a step S2 where a present duty ratio ISCDUTY (a duty signal to be sent to the ISC valve 10) is compared with a previous duty ratio ISCDUTYn−1. If the present duty ratio ISCDUTY is equal to the previous duty ratio ISCDUTYn−1, that is, the valve opening angle of the ISC valve 10 is constant, it is judged that the diagnostic condition is satisfied and the program goes to a step S3. If the ISC valve 10 opens or closes, the assist air volume increases or decreases according to the opening angle of the ISC valve 10 and as a result an accurate diagnosis can not be made. Accordingly, it is desirable that there is no change in the opening angle of the ISC valve 10.

When it is judged that the diagnostic conditions are satisfied at the steps S1 and S2, the program goes to a step S3 where a data acquisition flag FLAGON is referenced. In case where the diagnostic conditions are not satisfied, that is, in case where the engine is not in a fuel-cut mode or the opening angle of the ISC valve 10 is not constant, the program goes to a step S33. At steps S33 through S36, a diagnosis permission flag FLGDIAG, the data acquisition flag FLAGON, a diagnosis standby time CNTAAI and a diagnosis time CNTDIAG are cleared (FLGDIA←0, FLGON←0, CNTAAI←0, and CNTDIAG←0) and the program returns to START.

The data acquisition flag FLAGON is a flag indicating whether or not diagnosis data when the AAI solenoid valve 62 opens in this routine (hereinafter, referred to as valve opening data) have finished to be acquired. When the routine starts, the data acquisition flag FLAGON is set to zero (0) because the valve opening data have not yet finished to be acquired.

When at the step S3 it is confirmed that the data acquisition flag FLGON is equal 0, the program goes to a step S4 where the acquisition of the valve opening data of the AAI solenoid valve 62 is executed. Further, in case of FLGON=1, the program goes to a routine shown in FIG. 2, in which closing data of the AAI solenoid valve 62 are acquired and the assist air supply system is diagnosed.

When the program goes to the step S4, it is judged whether or not the AAI solenoid valve 62 opens by the ON signal. In case where it does not open, the program goes to the step S5 where The AAI solenoid valve 62 is energized (ON) and leaves the routine.

When at the step S4 it is judged that the AAI solenoid valve 62 is already turned ON and opens, the program goes to a step S6 where the diagnosis permission flag FLGDIAG is looked up. In this case, the diagnosis permission flag FLGDIAG is for requiring the ECU 40 to wait for acquiring the valve opening data. Generally, there is a response delay time since the AAI solenoid valve 62 opens until the intake manifold pressure downstream of the throttle valve 5a changes. To compensate this delay time, when a specified time elapses, it is necessary to allow data acquisition by showing that the diagnosis permission flag FLGDIAG is set (FLGDIAG←1). Before a specified time elapses, the diagnosis permission flag FLGDIAG is equal to 0.

Accordingly, in case where it is judged at the step S6 that the diagnosis permission flag FLGDIAG=0, the response delay time is compensated by processes from steps S7 to S10. That is, at a step S7 a diagnosis standby time CNTAAI is incremented and at a step S8 the diagnosis standby time CNTAAI is compared with an established standby time CNTSON which is obtained by simulations or experiments and stored in ROM 42 to compensate the response delay time when the AAI solenoid valve 62 opens.

When it is judged at S8 that the diagnosis standby time CNTAAI has not reached the established standby time CNTSON, the program leaves the routine and then the steps S1 to S7 are carried out repeatedly. On the other hand, when the established standby time CNTSON elapses after the AAI solenoid valve 62 opens, the program goes from the steps S8 to S9 where the diagnosis standby time CNTAAI is cleared (CNTAAI←0) and after at a step S10 the diagnosis permission flag FLGDIAG is set (FLGDIAG←1) , the program leaves the routine.

Thus, after the established standby time elapses, the diagnosis permission flag FLGDIA is set to 1 at the step S10 and at the next routine the program goes from the step S6 to the step S11 where the valve opening data is acquired.

First, at the step S11, the diagnosis time CNTDIAG indicating the data acquisition time of diagnostic data is incremented. Next, at a step s12, an already acquired maximum value MBPOPENMAX of the intake manifold pressure at the valve opening is compared with a value this time acquired of the intake manifold pressure MBP. In case where the intake manifold pressure value MBP this time acquired exceeds the maximum value MBPOPENMAX of the intake manifold pressure, the program goes to a step S13 where the maximum value MBPOPENMAX of the intake manifold pressure is rewritten as the this time acquired value MBP. That is, at the steps S12 and S13, in case where a present value of the intake manifold pressure MBP exceeds the maximum value of previous intake manifold pressure values, the present value is introduced as the maximum vale and the maximum value MBPOPENMAX of the intake manifold pressure is updated. On the other hand, in case where the value this time acquired MBP is smaller than the maximum value MBPOPENMAX of the intake manifold pressure, the program skips to a step S14.

At the step S14, the diagnosis time CNTDIAG is compared with a valve opening established diagnosis time CNTSOPEN established beforehand for data acquisition. In case where the diagnosis time CNTDIAG is smaller the valve opening established diagnosis time CNTSOPEN, the program leaves the routine. On the other hand, in case where the diagnosis time CNTDIAG reaches valve opening established diagnosis time CNTSOPEN, the program goes to steps S15 through S17, in which the diagnosis time CNTDIAG is cleared (at S15, CNTDIAG←0) and the data acquisition flag FLGON is set (at S16, FLGON←1). Further, the diagnosis permission flag FLGDIAG is cleared (at S17, FLGDIAG←0).

When the valve opening data is thus acquired, the data acquisition flag FLGON is set to 1. As a result, on and after the next routine, the program goes from the step S3 to a step S18 of FIG. 2. At the step S18, it is judged whether or not the AAI solenoid valve 62 is turned OFF and closes. In case where the valve does not close, the program goes to a step S19 where the AAI solenoid valve 62 is turned OFF and the program leaves the routine.

At the step S18, when the AAI solenoid valve 62 is turned OFF and has already closed, the program goes to a step S20 where the diagnosis permission flag FLGDIAG is looked up. Also in this case, since there is a response delay time since the AAI solenoid valve 62 closes until the intake manifold pressure downstream of the throttle valve 5a changes, in order to compensate this delay time, after the AAI solenoid valve 62 opens, the data acquisition of the diagnostic data must wait for a specified standby time. After a specified standby time elapses, the diagnosis permission flag FLGDIAG is set (FLGDIAG←0). Before that specified time standby time elapses, the diagnosis permission flag FLGDIAG is equal to 0.

In case where at a step S20 the diagnosis permission flag FLGDIAG is equal to 0 (FLGDIAG=0), the compensation of the response delay time is performed through the steps from S21 to S24. That is, at a step S21 the diagnosis standby time CNTAAI is incremented and then at a step S22 the diagnosis standby time CNTAAI is compared with an established standby time CNTSOFF which is established beforehand for compensating the response delay time at the valve closing. The established standby time CNTSOFF is determined through simulations or experiments and stored in ROM 42.

Further, when it is judged at a step S22 that the diagnosis standby time CNTAAI does not reach the established standby time, the program returns to START and the processes are repeated from the step S1. On the other hand, in case where after the AAI solenoid valve opens, the established standby time CNTSOFF elapses, the program goes from a step S22 to a step S23 where the diagnosis standby time CNTAAI is cleared (CNTAAI←0), at a step S24 the diagnosis permission flag FLGDIAG is set (FLGDIAG←1) and the program returns to START.

Thus, after the established standby time CNTSOFF elapses, since at a step S24 the diagnosis permission flag FLGDIAG is set, at the next routine the program skips from the step S20 to the step S25 where the data acquisition of the valve closing data is performed.

First, at the step S25, the diagnosis time CNTDIAG representing an execution time of the diagnosis data acquisition is incremented. Next, at a step S26 a previously acquired minimum intake manifold pressure value at the valve closing BPCLOSEMIN is compared with the this time acquired intake manifold pressure MBP. In case where the this time acquired value MBP is smaller than the minimum intake manifold pressure value BPCLOSEMIN, the program goes to a step S27 where the minimum intake manifold pressure value BPCLOSEMIN is rewritten by the this time acquired value MBP. On the other hand, in case where the this time acquired value MBP is larger than the minimum intake manifold pressure value BPCLOSEMIN, the program skips to a step S28. That is, at steps S26, S27, in case where the present (previously acquired) intake manifold pressure value MBP is smaller than the minimum value ever obtained, this value MBP is introduced as a new minimum value and the minimum intake manifold pressure value BPCLOSEMIN is updated.

After that, at a step S28 the diagnosis time CNTDIAG is compared with an established diagnosis time at the valve closing CNTSCLOSE established beforehand for acquiring the valve closing data and in case where the diagnosis time CNTDIAG is smaller than the established diagnosis time at the valve closing CNTSCLOSE, the program returns to START.

On the other hand, in case where the diagnosis time CNTDIAG reaches the established diagnosis time at the valve closing CNTSCLOSE, the program goes to a step S29. It is judged whether or not the assist air supply system is normal by the processing at the step S29 and after. That is, at the step S29 the difference between the maximum intake manifold pressure value MBPOPENMAX when the assist air is supplied and the minimum intake manifold pressure value MBPCLOSEMIN when the assist air is shut down, is calculated and that difference is compared with a threshold value LVLMIS for judging whether or not the assist air supply system is normal. The threshold value LVLMIS is obtained beforehand by simulations or experiments.

Figure 3:
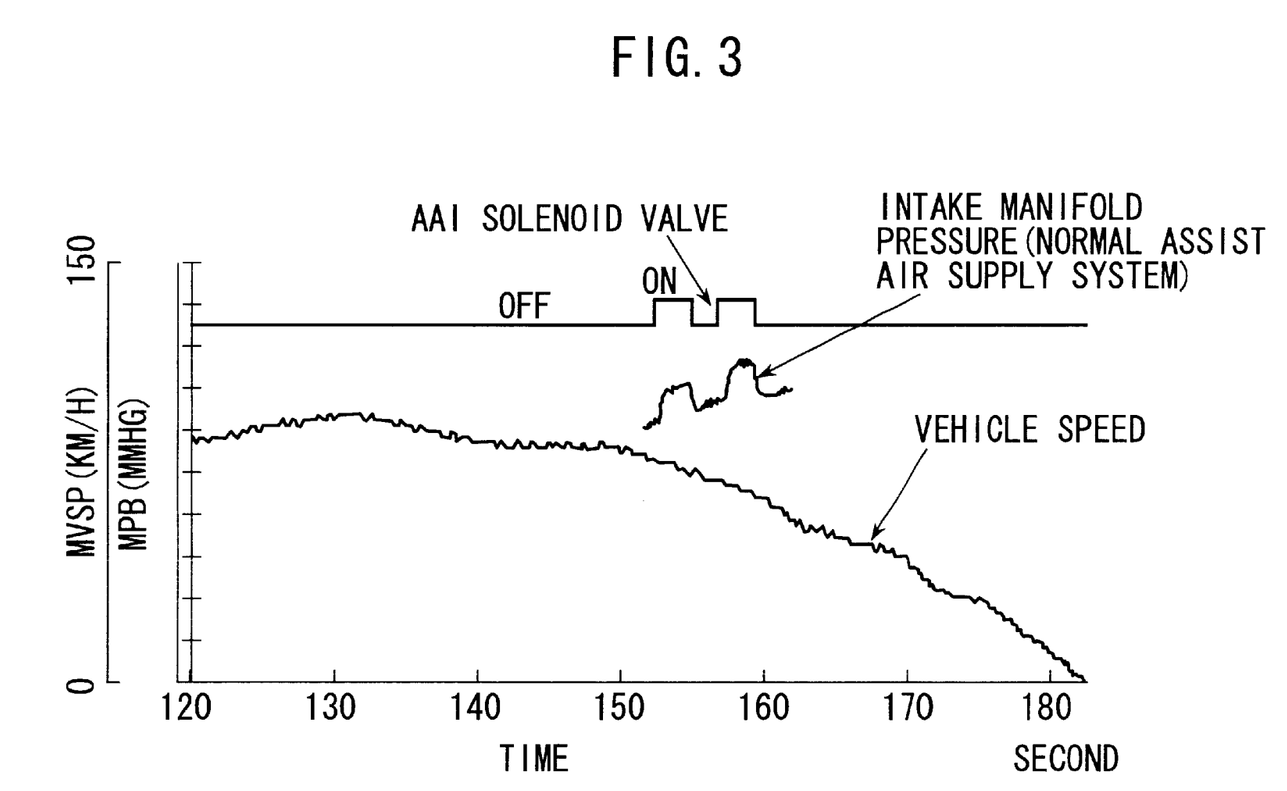
FIG. 3 is a diagram showing a relationship between the opening and closing of an AAI solenoid valve, intake manifold pressure and vehicle speeds.

In case where the assist air supply system is normal, when the AAI solenoid valve 62 is turned ON and OFF, as shown in FIG. 3, the intake manifold pressure increases and decreases according to the ON and OFF operation of the AAI solenoid valve 62 with a response delay time. That is, there occurs a difference greater than a specified value between the maximum intake manifold pressure value MBPOPENMAX and the minimum intake manifold pressure value MBPCLOSEMIN. On the other hand, in case where there is a clogging of the assist air passage 64, a disconnection of pipes, an open-valve sticking or a closed-valve sticking of the AAI solenoid valve 62 and the like, since the supply volume of assist air makes no change, quite a few difference is generated between the maximum intake manifold pressure value MBPOPENMAX and the minimum intake manifold pressure value MBPCLOSEMIN. Accordingly, the difference between the maximum intake manifold pressure value MBPOPENMAX when the valve opens and the minimum intake manifold pressure value MBPCLOSEMIN when the valve closes is calculated and if the difference exceeding the threshold value LVLMIS, it can be judged that the assist air supply system is normal, if the difference being smaller the threshold value LVLMIS, it can be judged that the system has a failure somewhere.

At a step S29, it is judged whether or not the assist air supply system is normal by comparing the maximum intake manifold pressure value MBPOPENMAX with the minimum intake manifold pressure value MBPCLOSEMIN. That is, the product of subtraction of the minimum intake manifold pressure value MBPCLOSEMIN from the maximum intake manifold pressure value MBPOPENMAX is compared with the threshold value LVLMIS.

In case where the product of subtraction of the minimum intake manifold pressure value MBPCLOSEMIN from the maximum intake manifold pressure value MBPOPENMAX is smaller than the threshold value LVLMIS, it is judged that there is something abnormal in the assist air supply system and the program goes to a step S30 where an assist air no good flag FLGNG indicating an abnormality of the assist air supply system is set (FLGNG←1). Based on the judgment that the assist air supply system has something abnormal, the warning lamp 61 is turned on or turned on and off to inform the driver of a failure in the assist air supply system.

On the other hand, in case where the product of subtraction of the minimum intake manifold pressure value MBPCLOSEMIN from the maximum intake manifold pressure value MBPOPENMAX is larger than the threshold value LVLMIS, it is judged that the assist air supply system is normal and the program goes to a step S31 where the assist air no good flag is cleared (FLGNG←0).

Further, after the assist air no good flag is cleared, the program goes to a step S32 where those data are stored as monitor data. When the external connector 55 is a serial monitor 60, the serial monitor 60 reads out trouble data stored in the back-up RAM 44 including the assist air no good flag FLGNG to make a diagnosis of the engine 1. These trouble data can be cleared by the serial monitor 60.

When the data are stored at the step S32 and the diagnosis finishes, the program goes to steps S33 to S36 where the diagnosis permission flag FLGDIAG, the valve opening data acquisition flag FLGON, the diagnosis standby time CNTAAI and the diagnosis time CNTDIAG are cleared for the next diagnosis (FLGDIAG ←0, FLGON ←0, CNTAAI ←0, and CNTDIAG ←0) and the program returns to START.

While the presently preferred embodiment of the present invention has been shown and described, it is to be understood that this disclosure is for the purpose of illustration and that various changes and modifications may be made without departing from the scope of the invention as set forth in the appended claim.

What is claimed is:

1. A diagnostic apparatus of an assist air supply system having an assist air passage for supplying a part of an intake air of an engine as an assist air to the vicinity of an injection nozzle of a fuel injector and an assist air supply control means provided in said assist air passage for controlling a supply of said assist air, comprising:

an intake manifold pressure detecting means for detecting an intake manifold pressure downstream of a throttle valve of an intake air system of said engine;

a difference calculating means for calculating a difference between a first detection value of said intake manifold pressure detecting means when said assist air is supplied by controlling said assist air supply control means in the condition that said engine is in a fuel-cut mode and a second detection value of said intake manifold pressure detecting means when said assist air is shut down in the condition said engine is in a fuel-cut mode; and an abnormality judging means for judging an abnormality of said assist air supply system when said difference between said first detection value and said second detection value is smaller than a specified threshold value.

2. A diagnostic apparatus of an assist air supply system of an engine having an intake pipe, a throttle valve provided in said intake pipe, a bypass passage provided in said intake pipe and bypassing said throttle valve and an idle speed control valve for controlling an engine speed at idle by adjusting a bypass air amount passing through said bypass passage, the assist air supply system including an assist air passage provided in said bypass passage for supplying a part of an intake air of said engine as an assist air to the vicinity of an injection nozzle of a fuel injector and an assist air supply control means provided in said assist air passage for controlling a supply of said assist air, comprising:

an intake manifold pressure detecting means for detecting an intake manifold pressure downstream of said throttle valve of an intake air system of said engine;

a difference calculating means for calculating a difference between a first detection value of said intake manifold pressure detecting means when said assist air is supplied by controlling said assist air supply control means in the condition that said engine is in a fuel-cut mode and that a valve opening angle of said idle speed control valve is constant and a second detection value of said intake manifold pressure detecting means when said assist air is shut down by controlling said assist air supply control means in the condition that said engine is in a fuel-cut mode and that a valve opening angle of said idle speed control valve is constant; and an abnormality judging means for judging an abnormality of said assist air supply system when said difference between said first detection value and said second detection value is smaller than a specified threshold value.

3. The apparatus according to claim 1, wherein said difference calculating means calculates a difference between a maximum value of detection values of said intake manifold pressure detecting means when said assist air is supplied and a minimum value of detection values of said intake manifold pressure detecting means when said assist air is shut down.

4. The apparatus according to claim 2, wherein said difference calculating means calculates a difference between a maximum value of detection values of said intake manifold pressure detecting means when said assist air is supplied and a minimum value of detection values of said intake manifold pressure detecting means when said assist air is shut down.

* * * * *